United States Patent [19]

Ansaldi et al.

[11] Patent Number: 4,956,192

[45] Date of Patent: Sep. 11, 1990

[54] PROCESS FOR OBTAINING NATURAL VANILLA FLAVOR BY TREATMENT OF GREEN VANILLA BEANS, AND THE FLAVOR OBTAINED

[75] Inventors: Gwenaele Ansaldi, Marseille; Gérard Gil, Aubagne; Jean Le Petit, Allauch, all of France

[73] Assignee: Societe Nationale Elf Aquitaine, Courbevoie, France

[21] Appl. No.: 388,807

[22] Filed: Aug. 3, 1989

[30] Foreign Application Priority Data

Aug. 3, 1988 [FR] France ................................. 88 10473

[51] Int. Cl.⁵ .............................................. A23L 1/221
[52] U.S. Cl. .................................. 426/425; 426/429; 426/431; 426/44
[58] Field of Search ................. 426/44, 425, 429, 431; 435/650, 259

[56] References Cited

U.S. PATENT DOCUMENTS

| | | | |
|---|---|---|---|
| 2,621,127 | 12/1952 | Towt | 426/44 |
| 2,835,591 | 5/1958 | Graves et al. | 426/44 |
| 3,352,690 | 11/1967 | Kaul | 426/44 |
| 3,991,215 | 11/1976 | Robbins | 426/60 |
| 4,002,772 | 1/1977 | Haas | 426/640 X |
| 4,470,927 | 9/1984 | Schütz et al. | 426/425 |

*Primary Examiner*—Joseph Golian
*Attorney, Agent, or Firm*—Oblon, Spivak, McClelland, Maier & Neustadt

[57] ABSTRACT

A process for enhancing a natural vanilla flavor, comprising; freezing mature green vanilla beans at a temperature between $-5°$ C. and $-30°$ C., thawing the frozen beans, and then extracting the flavor constituents from the beans.

3 Claims, No Drawings

PROCESS FOR OBTAINING NATURAL VANILLA FLAVOR BY TREATMENT OF GREEN VANILLA BEANS, AND THE FLAVOR OBTAINED

BACKGROUND OF THE INVENTION

1. Field of the Invention

The present invention relates to a process for obtaining a vanilla flavor by treatment of green vanilla beans, and to the flavor obtained.

2. Description of the Background

The constituents of the vanilla flavor, in particular vanillin, vanillic acid, para-hydroxybenzoic acid and para-hydroxybenzoic aldehyde, are practically absent from the mature green bean at harvesting. The constituents form slowly in the bean after picking.

Normally beans which have been freshly gathered are processed by (1) heating the beans at 65° C. while they are immersed in water for 3 minutes, (ii) seasoning during which the beans are placed in boxes lined with wool for 48 h at 30°–40° C., in which they lose their water and take on their brown color, (iii) drying, in three successive stages, which consists in holding the beans in an oven at 65° C. for 3 hours per day for 7 days, then in exposing them to the sun for 3 to 5 hours per day for 7 days and finally keeping them in the shade, in an airy place, for a month, and lastly, (iv) a final maturation, which lasts 8 months, in closed chambers, During the last stage, the state of the beans is monitored each week, and the relatively numerous ones which show mycelial development on the surface are removed, which increases the cost of the treatment.

By this treatment, which is long and which involves numerous manipulations, between 2 and 3 grams of vanillin per 100 g of dry matter in the green beans is obtained, according to the batches of beans and their origin.

In Food Research 8 p. 343–351 (1943), F. E. Arana has indicated that the vanillin formed during the treatment of the beans results from the hydrolysis of a glucoside which is found in the green bean. This glucoside may be extracted from the bean with ethanol, and hydrolyzed either by a $\beta$-glucosidase or by an acid in an aqueous medium.

Although in the conventional process there is no more glucovanillin in the treated bean, the quantity of vanillin present at the end of treatment is less than that which could be expected on the basis of the quantity of glucoside present on picking. Accordingly, it should be possible to obtain up to about 5 g of vanillin per 100 g of dry matter, instead of the usual 2 to 3 g. This reduction in the amount of vanillin obtained is likely to be caused by enzymatic or microbial decomposition of the vanillin during its formation, thereby resulting in the formation of vanillic acid in particular. A need therefore exists for a means of obtaining greater yields of vanillin from the vanilla bean.

SUMMARY OF TEH INVENTION

Accordingly, one object of the present invention is to provide a means of increasing the amount of vanilla which can be extracted from the vanilla bean.

Briefly, this object and other objects of the invention as hereinafter will become more readily apparent can be attained by a process of obtaining natural vanilla flavor by freezing mature green vanilla beans at a temperature between $-5°$ C. and $-30°$ C., thawing the frozen beans; and then extracting the flavor constituents from the beans.

DETAILED DESCRIPTION OF THE PREFERRED EMBODIMENTS

In the process of the present invention the vanilla beans may be frozen as soon as they have been harvested, or several days afterwards if they are kept in a dry and ventilated place. The length of freezing only has a little influence on the final yield of vanillin. Accordingly, the beans may be frozen as little as a day or a week or several months. The rate at which the beans are frozen is not critical. It has been ascertained that the freezing can be instantaneous, by introduction of the beans into a refrigerated chamber, or decidedly slower, by reducing the temperature of the chamber over a few hours, without modification of the yield of vanillin.

The frozen beans contain practically no vanillin. Vanillin only appears during warming-up of the bean, which warming may simply occur by removing beans from the refrigerated chamber and exposing them to air at ambient temperature for several hours, or the frozen beans may be introduced into a chamber the temperature of which is between ambient temperature, that is about 20° C., and 60° C. and preferably around 40° C., for 2 to 4 hours. The time needed for hydrolysis to be complete and the yield to be at its maximum is a function of the speed of heating and of the final temperature.

The speed of heating will depend in particular on the quantity of beans introduced into the warm chamber and on the temperature of that chamber. The specialist will be able, by means of a few preliminary trials, to determine the best heating conditions for an optimal yield.

It is preferable, in order to obtain an optimum yield, to treat the beans shortly after thawing to extract the components of the vanilla flavor from them. This is carried out in the conventional manner, for example by treating the beans with hot ethanol or by a solvent in a supercritical state.

The process according to the invention allows at least 80% of the expected vanillin, based on the quantity of precursor present in the green beans on picking, to be obtained, besides other constituents of the natural vanilla flavor in more or less modified proportions, after a very short treatment, the last stage of which can be carried out at any moment after the harvest of the vanilla bean in order to satisfy the needs of the market.

Having now generally described this invention, a further understanding can be obtained by reference to certain specific examples which are provided herein for purposes of illustration only and are not intended to be limiting unless otherwise specified.

Green, but mature vanilla beans, harvested at the usual time, were employed in the following examples.

EXAMPLE 1

20 g of green Comoro Islands vanilla beans, gathered 8 days previously, were frozen at $-18°$ C. After a few days at that temperature, the beans were transferred into enclosed chambers maintained at given temperatures for various times.

The beans were then treated with ethanol in a Soxhlet extractor for 12 h, in order to extract all of the flavor constituents and the glucosides. About 200 ml ethanol were used for 15 g beans. The control (thawing time $=0$) was introduced into the ethanol while frozen.

The quantities of glucovanillin and vanillin extracted from the beans with ethanol were determined by high performance liquid chromatography (HPLC) in the reverse phase (Ultrasphere C 18 column; 5 microns) and eluting (flow rate $=1.2$ ml/min) with a mixture of water and acetonitrile (90/10

The results obtained after thawing at 25° C., 30° C., 40° C. or 50° C. are shown in Table 1.

The quantities of glucovanillin and vanillin are expressed as a percentage of the dry weight of the bean.

After maturation, vanilla beans treated by the conventional process, contained about 2 to 2.5% vanillin.

TABLE 1

| | Glucovanillin | | | | Vanillin | | | |
| | | | | | a | | | |
| b | 25° C. | 30° C. | 40° C. | 50° C. | 25° C. | 30° C. | 40° C. | 50° C. |
|---|---|---|---|---|---|---|---|---|
| 0 | 11.31 | 11.31 | 11.31 | 11.31 | 0.55 | 0.55 | 0.55 | 0.55 |
| 1 h | | | 1.82 | | | | 3.84 | |
| 1 h 30 | 1.20 | 1.63 | 2.02 | 2.06 | 3.90 | 2.34 | 2.43 | 2.28 |
| 2 h | | | 1.07 | | | | 4.27 | |
| 3 h | 0.04 | 1.76 | 1.06 | 0.74 | 4.30 | 4.68 | 4.11 | 3.40 |
| 5 h | | 1.03 | | | | 4.23 | | | a: thawing temperature
b: thawing time

EXAMPLE 2

Two fresh green Comoro Island vanilla beans were frozen at $-18°$ C., then maintained at 40° C. in a closed tube for 2 h 30 min.

These beans were then subjected to ethanolic extraction and the relative concentrations of parahydroxybenzoic acid, vanillic acid, para-hydroxybenzoic aldehyde and vanillin in the extract were determined by HPLC on a BONDAPACK C 48 column. The mobile phase was $10^{-2}$ M phosphoric acid (75%) and methanol (25%), the flow rate being 1 ml min$^{-1}$. The compounds were detected by ultraviolet absorption.

The relative concentrations of the major components of these two extracts are shown in Table 2, together with those mentioned in Analysis Vol. 15, p. 217-226 (1987), which were obtained for samples, the maturation of which was carried out according to a conventional process.

TABLE 2

| Origin of pods | Thawed green beans (Comoro Islands) | Reunion and Comoro Islands | Madagascar | Tonga |
|---|---|---|---|---|
| V/P | 12.36 to 12.4 | 14.50 to 19.10 | 12.90 to 15.90 | 16.60 to 23.30 |
| V/VA | 42.7 to 46 | 23.00 to 29.10 | 14.90 to 19.30 | 14.50 to 32.40 |
| V/PA | 78.1 and 85.1 | 69.10 to 110.40 | 53.10 to 87.90 | 55.10 to 194.50 |
| PA/P | 0.15 and 0.16 | 0.149 to 0.220 | 0.169 to 0.293 | 0.092 to 0.333 |
| VA/P | 0.27 and 0.29 | 0.527 to 0.681 | 0.709 to 1.010 | 0.550 to 1.513 |

PA = para-hydroxybenzoic acid;
VA = vanillic acid
P = para-hydroxybenzoic aldehyde;
V = vanillin The process of the present invention and the method of extraction led in this case to an extract containing proportionally less vanillic acid than the extract obtained by the usual process.

EXAMPLE 3

Green beans containing, by weight of the dry matter, 9.2% glucovanillin and 1% vanillin, were frozen at the following different rates:

(i) freezing by introducing a few beans into a household-type freezer (volume: 50 l; T $= -18°$ C.);

(ii) freezing by immersing the beans for a few seconds in liquid nitrogen before introducing them into the same type of household freezer, (iii) freezing by introducing the beans into a chamber, the internal temperature of which was lowered in 5 hours from 20° C. to $—20°$ C. before introducing them into the same type of household freezer.

In all three cases, the beans were thawed by maintaining them in a chamber at 40° C. for 3 hours. The beans no longer contained glucovanillin. The levels of vanillin extracted with ethanol, as in the preceding examples, are shown in Table 3.

TABLE 3

| Freezing according to | | a | | b | c |
|---|---|---|---|---|---|
| Thawing after (days) | 1 | 2 | 7 | 7 | 7 |
| Level of | 5.22 | 4.20 | 4.69 | 5.95 | 5.61 |

TABLE 3-continued

| Freezing according to | a | b | c |
| --- | --- | --- | --- |
| vanillin | | | |

Having now fully described the invention, it will be apparent to one of ordinary skill in the art that many changes and modifications can be made thereto without departing from the spirit or scope of the invention as set forth herein.

What is claimed as new and is intended to be secured by Letters Patent is:

1. A process for enhancing a natural vanilla favor, comprising:
   freezing mature green vanilla beans at a temperature between −5° C. and −30° C.;
   thawing the frozen beans at a temperature from about 20° C. to about 60° C.; and then
   extracting the flavor constituents from the beans.

2. The process of claim 1, wherein the beans are frozen at a temperature between −15° C. and −20° C.

3. The process of claim 1, wherein the beans are thawed by introducing the same into a chamber between 30° C. and 50° C. for from 2 to 4 hours.

* * * * *